US006102536A

United States Patent [19]

Jennel

[11] Patent Number: 6,102,536

[45] Date of Patent: Aug. 15, 2000

[54] METHOD AND APPARATUS FOR PRINTING IMAGES ON A WEB OF PACKAGING MATERIAL

[75] Inventor: Per Jennel, Chicago, Ill.

[73] Assignee: Tetra Laval Holdings & Finance, SA, Pully, Switzerland

[21] Appl. No.: 09/039,652

[22] Filed: Mar. 16, 1998

Related U.S. Application Data

[63] Continuation-in-part of application No. 08/599,513, Jan. 26, 1996, abandoned.

[51] Int. Cl.[7] .............................. G01D 11/00; B31B 1/88

[52] U.S. Cl. .............................................. 347/100; 493/187

[58] Field of Search ..................................... 101/212, 483; 347/100; 427/493, 261, 265, 384, 504, 510, 552; 400/82, 352, 357

[56] References Cited

U.S. PATENT DOCUMENTS

| | | | |
|---|---|---|---|
| 4,003,312 | 1/1977 | Gunther . | |
| 4,243,694 | 1/1981 | Mansukhani . | |
| 4,258,367 | 3/1981 | Mansukhani . | |
| 5,096,781 | 3/1992 | Vieira et al. . | |
| 5,270,368 | 12/1993 | Lent et al. . | |
| 5,328,438 | 7/1994 | Crowley | 493/187 |
| 5,400,063 | 3/1995 | Kappel . | |
| 5,403,358 | 4/1995 | Aston et al. . | |
| 5,423,617 | 6/1995 | Marsh et al. | 400/82 |
| 5,495,803 | 3/1996 | Gerber et al. . | |
| 5,633,664 | 5/1997 | Bayat . | |

*Primary Examiner*—Arthur T. Grimley
*Assistant Examiner*—Hoang Ngo
*Attorney, Agent, or Firm*—Welsh & Katz, Ltd.

[57] ABSTRACT

A method and apparatus for printing digital graphic images directly onto a web of packaging material. First, an electronically storable and retrievable digital image is generated. Next, the digital image is transferred to a printing site. Finally, the digital image is digitally printed directly onto the web of packaging material at the printing site. The ink can be provided as a UV-reactive ink, in which instance the UV-reactive ink, after the step of printing, can be cured by exposure to UV light. The present invention allows for full color digital graphic images to be printed directly onto the surface of a web of packaging material. The web of packaging material may be a plastic material, a laminated fiberboard material or the like.

20 Claims, 9 Drawing Sheets

METHOD AND APPARATUS FOR PRINTING IMAGES ON A WEB OF PACKAGING MATERIAL

CROSS REFERENCES TO RELATED APPLICATIONS

This application is a continuation-in-part application of U.S. patent application Ser. No. 08/599,513, filed on Jan. 26, 1996 now abandoned which is hereby incorporated by reference.

STATEMENT REGARDING FEDERALLY SPONSORED RESEARCH OR DEVELOPMENT

Not Applicable

BACKGROUND OF THE INVENTION

1. Field of the Invention

The present invention relates generally to printing images on packaging material, and specifically to generating and printing digital images onto a web of packaging material for plastic pouches and laminated material packages such as parallelepiped containers and cartons 2. Description of the Related Art Creators of packages and containers have provided their products with images since before history was recorded. However, from pre-Columbian pottery to polyethylene pouches, the process of creating and transferring imagery to containers has been labor-intensive, time-consuming, and wasteful of materials. This remains true despite the many changes that have taken place in the printing industry over the past decade.

The computer has been responsible for much of this revolution, particularly in the prepress industry. The influence of the computer was felt first in art creation, color separation, and proofing. As is evident from the ever-expanding arena of desktop publishing, many of these changes are still in progress, driven by the rapid advances made in the world of electronic communications.

Along with these changes, a peculiar imbalance has developed in the industry. While prepress operations in most firms were influenced dramatically by the advent of the computer, the pressroom has remained essentially undisturbed for years. In many printing plants, it has become commonplace to find the most modern technologies used to create artwork and even to process films and plates, while the package material printing process still employs plates or cylinders, press make-ready, printing and finishing operations that differed little from those in use for decades. Thus, packagers create and prepare artwork on computers, often in a matter of hours, only to end up using the same printing equipment and techniques known to their grandparents. These processes often take weeks to complete, consuming vast amounts of labor and energy while generating mountains of waste.

Concurrent with, but largely independent of, this revolution in artwork preparation, market pressures in the computer industry have resulted in the rapid development of new printing devices. Among these new devices are digital, non-impact printers using laser jet or bubble jet technologies, which have become commonplace in even the smallest offices. Despite their widespread acceptance in a variety of environments, these technologies have yet to be applied in an effective way in the production of printed substrates, such as packaging materials.

In the packaging industry, the most commonly used printing techniques are gravure and offset. In a typical gravure printing process, it is not unusual for five to nine weeks to pass between the time of creation of original artwork until packaging material delivery to the customer. The gravure process can generally be described as follows. Once the packaging producer receives the artwork, it must be checked. Next, separations and bromide proofs are made and checked, then forwarded to the customer for approval. Once the bromide proofs are approved, the producer generates a lithographic, or "litho", proof, which is again checked and sent to the customer. After the customer approves the litho proof, the package producer makes cylinders, then runs and checks cylinder proofs, and sends them to the customer for approval. If the cylinder proofs are acceptable, the press is prepared and set up. With the press set up, packaging material can be run, and subsequently delivered to the customer.

The offset process, while typically requiring somewhat less time than gravure, is similarly complex and time consuming. Once the packaging producer receives the artwork, it must be checked. Next, separations and match proofs are made and checked, then forwarded to the customer for approval. Once the match proofs are approved, the producer generates a litho proof, which is again checked and sent to the customer. After the customer approves the litho proof, the package producer exposes and develops plates, which are then mounted on the press. Next, the press blankets are cleaned, the press is set up, and the inks are balanced. The press is then ready for packaging material to be run, and subsequently delivered to the customer. The entire offset process often consumes from two to seven weeks.

Thus, it can be seen that, while electronic prepress has developed and become accepted as the norm in the production of packaging material, the development of suitable printing systems has lagged behind. It would be advantageous to provide a package material printing system using electronic printing techniques to print directly on to the desired substrate, thus reducing the number of steps from creation of a design to production of material, while reducing prepress work and eliminating vast amounts of waste. Such a system would increase productivity due to drastically reduced order-change and set-up time.

Current technology has allowed for the printing of small, one color (black) text on packages. However, this current technology is not a substitute for the full color printing produce through gravure and offset printing. What is needed is a printing system that may compete with, or even replace the gravure and offset printing techniques.

BRIEF SUMMARY OF THE INVENTION

The present invention provides a method and apparatus for printing on a web of packaging material that eliminates or ameliorates many of the drawbacks of previously known systems. In an embodiment, a method of printing on a web is provided in which an electronically storable and retrievable digital image is generated. Next, the digital image is transferred to a printing site. Finally, the digital image is digitally printed directly onto the web at the printing site. The step of digitally printing the digital image directly onto the web can include digitally printing the digital image directly onto a web of flexible plastic material such as polyethylene or PET (polyethylene terephthalate) coated with a silicon oxide, or on a web of a laminated fiberboard material intended for cartons or parallelepiped containers.

The step of digitally printing the digital image directly onto the web can include jetting ink through an inkjet printhead onto a surface of the web. The ink can be provided as a UV-reactive ink, in which instance the UV-reactive ink, after the step of printing, can be cured by exposure to UV light or an electron beam. It is also contemplated that the surface of the material could be treated prior to printing. Common surface treatment techniques include flame treatment, corona treatment, and plasma jet treatment.

It is contemplated that a form, fill and seal packaging machine could be provided at the print site, and that the printing step could be performed substantially concurrently with the forming, filling and sealing of a package.

The step of transferring the digital image to a printing site can include electronically transmitting the digital image to the printing site, e.g., via telephone modem.

The present invention provides an advanced level of automation, with minimum operator intervention. The end product of the prepress area is transmitted in electronic form directly to a electronic printing press, thus eliminating traditional labor-intensive prepress operations and materials. Equally important, make-ready and paper waste on electronic printing presses represent a small fraction of the corresponding costs in traditional printing operations.

It is a primary object of the present invention to provide a method and apparatus for digitally printing directly onto a web of packaging material.

It is an additional object of the present invention to provide a method and apparatus for digitally printing a graphic design directly onto a web of a flexible plastic material intended for fabrication into a series of pouches.

It is an additional object of the present invention to provide a method and apparatus for digitally printing a graphic design directly onto a web of a laminated material intended for fabrication into a series of parallelepiped containers.

It is an additional object of the present invention to provide a method and apparatus for digitally printing a graphic design directly onto a web of a laminated material intended for fabrication into a series of carton blanks.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 a schematic view of the digital printing system of the present invention;

Figure 1:
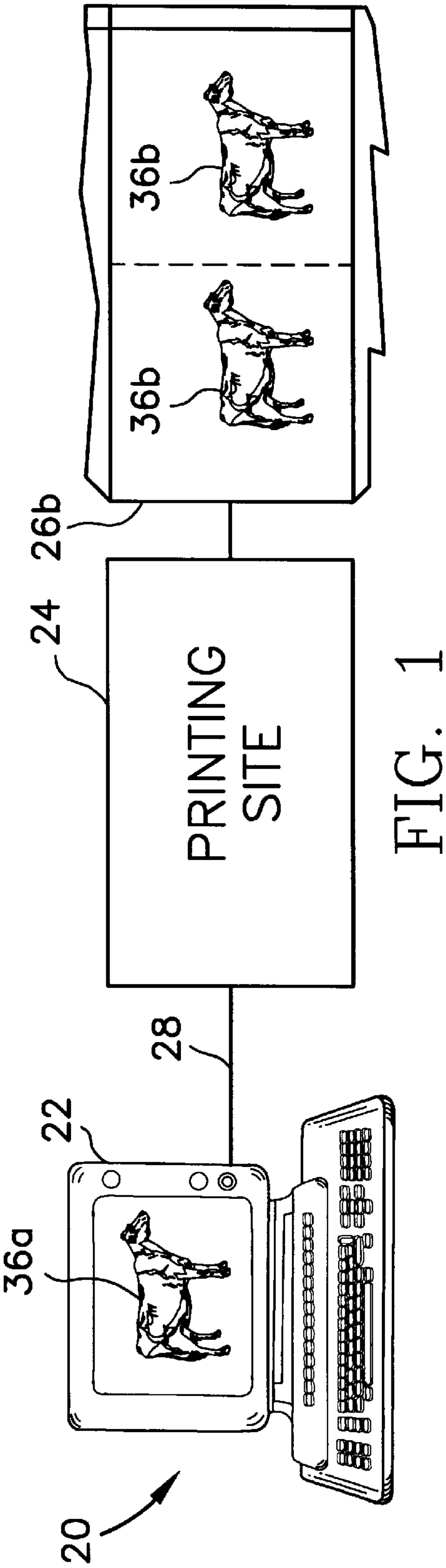
Figure 2:
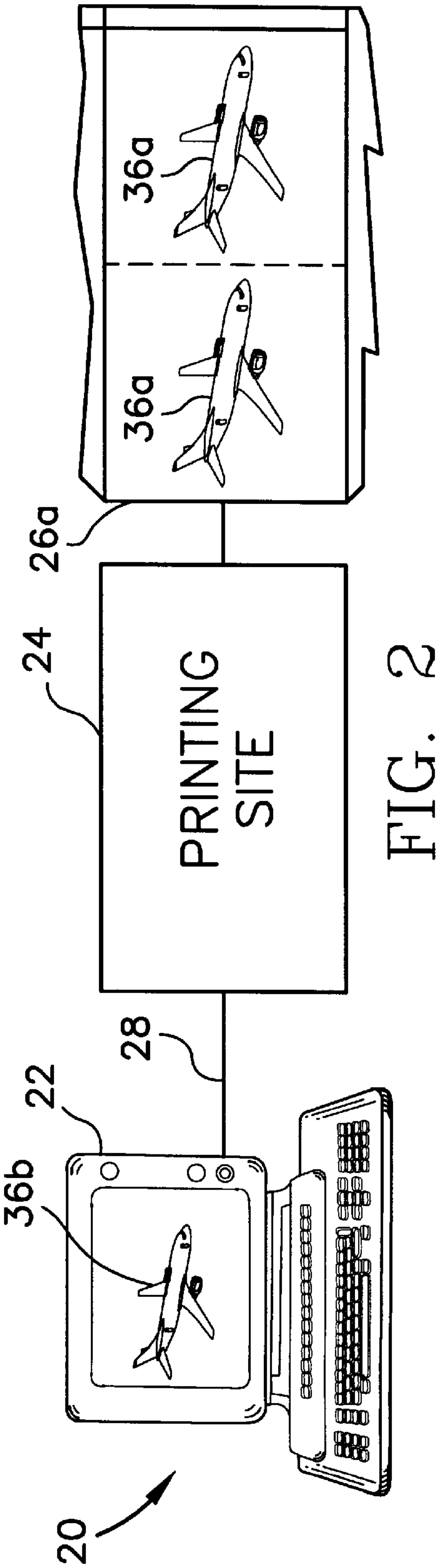
Figure 3:
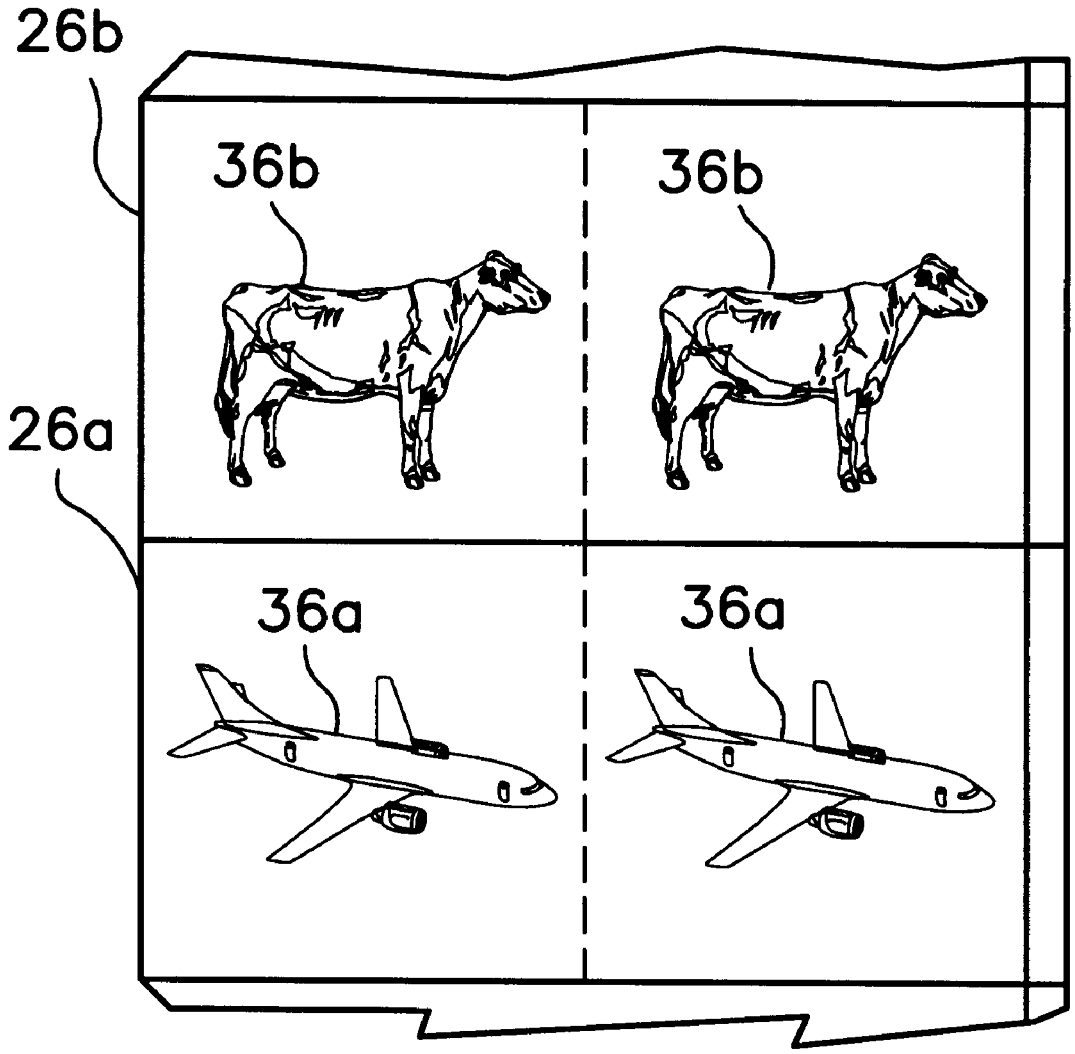
Figure 4:
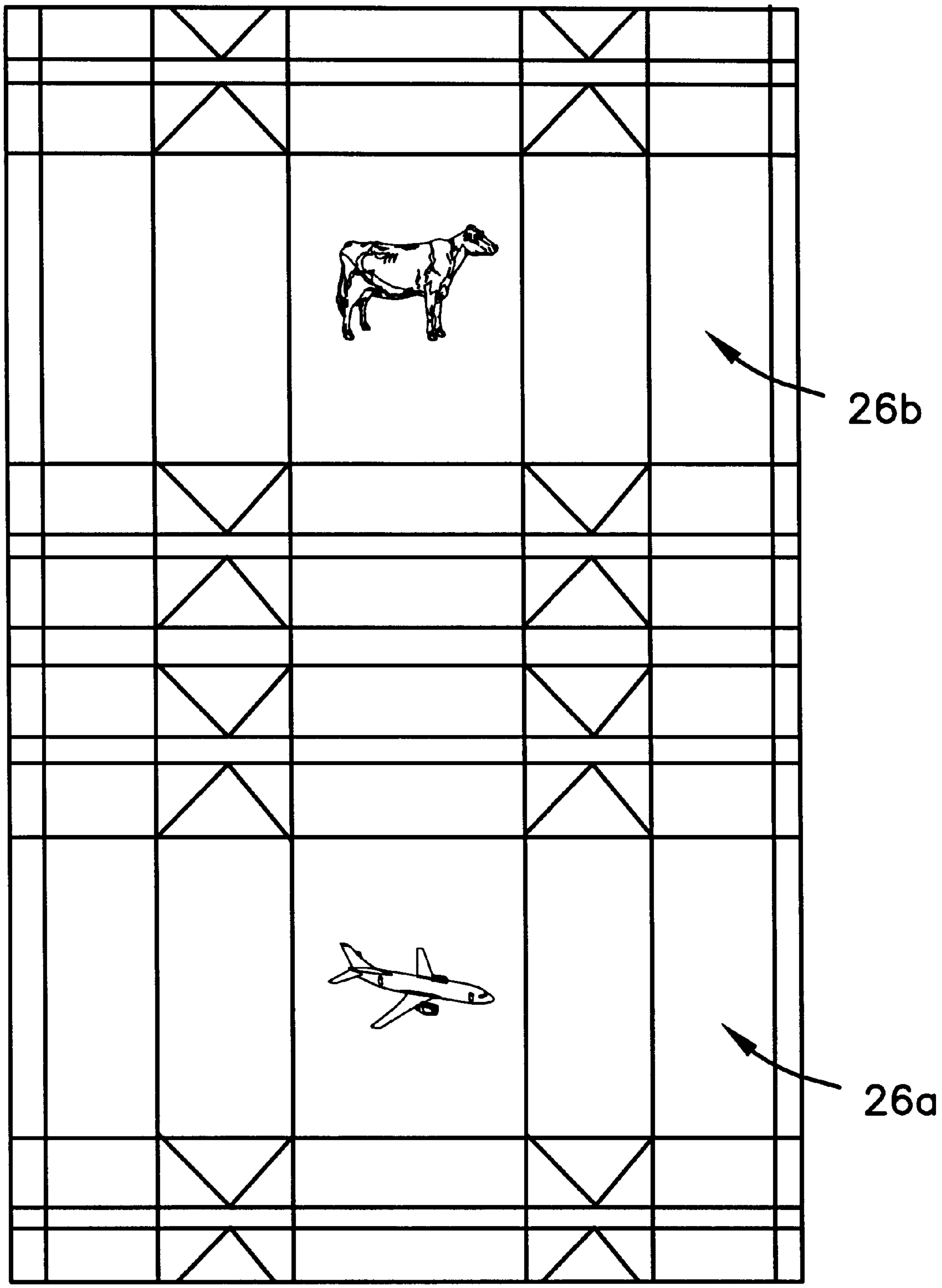
Figure 5:
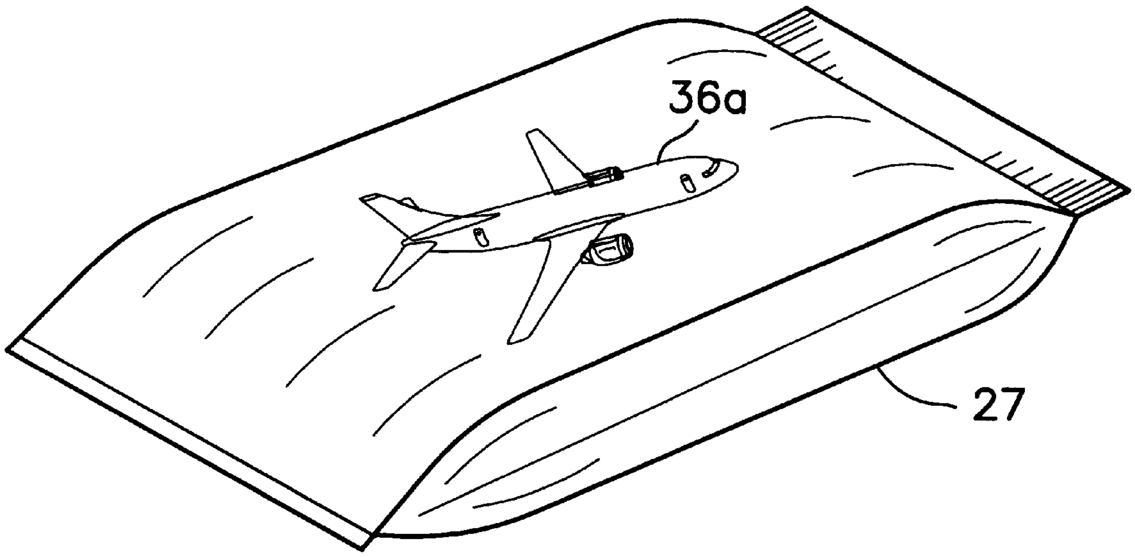
Figure 5A:
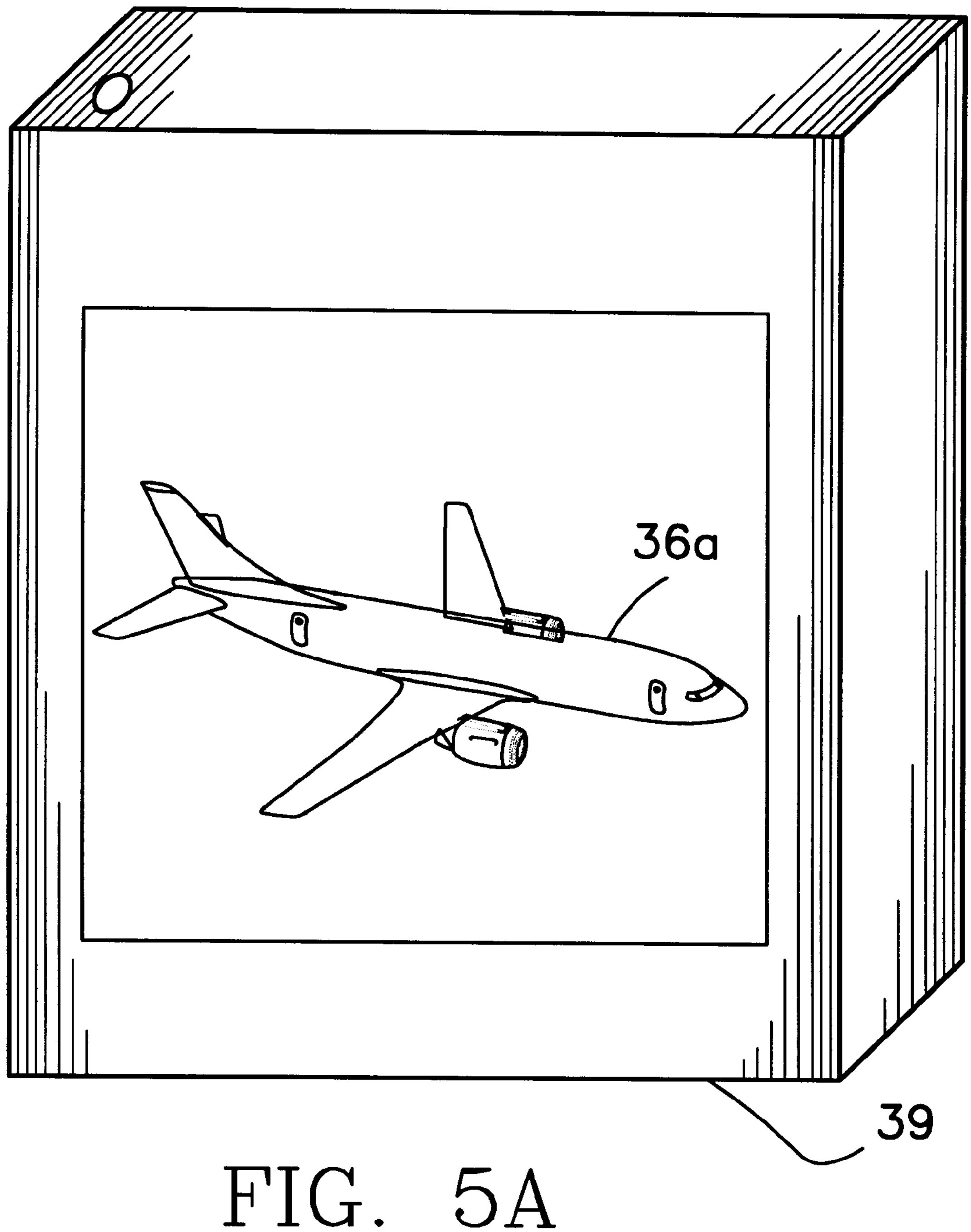
Figure 6:
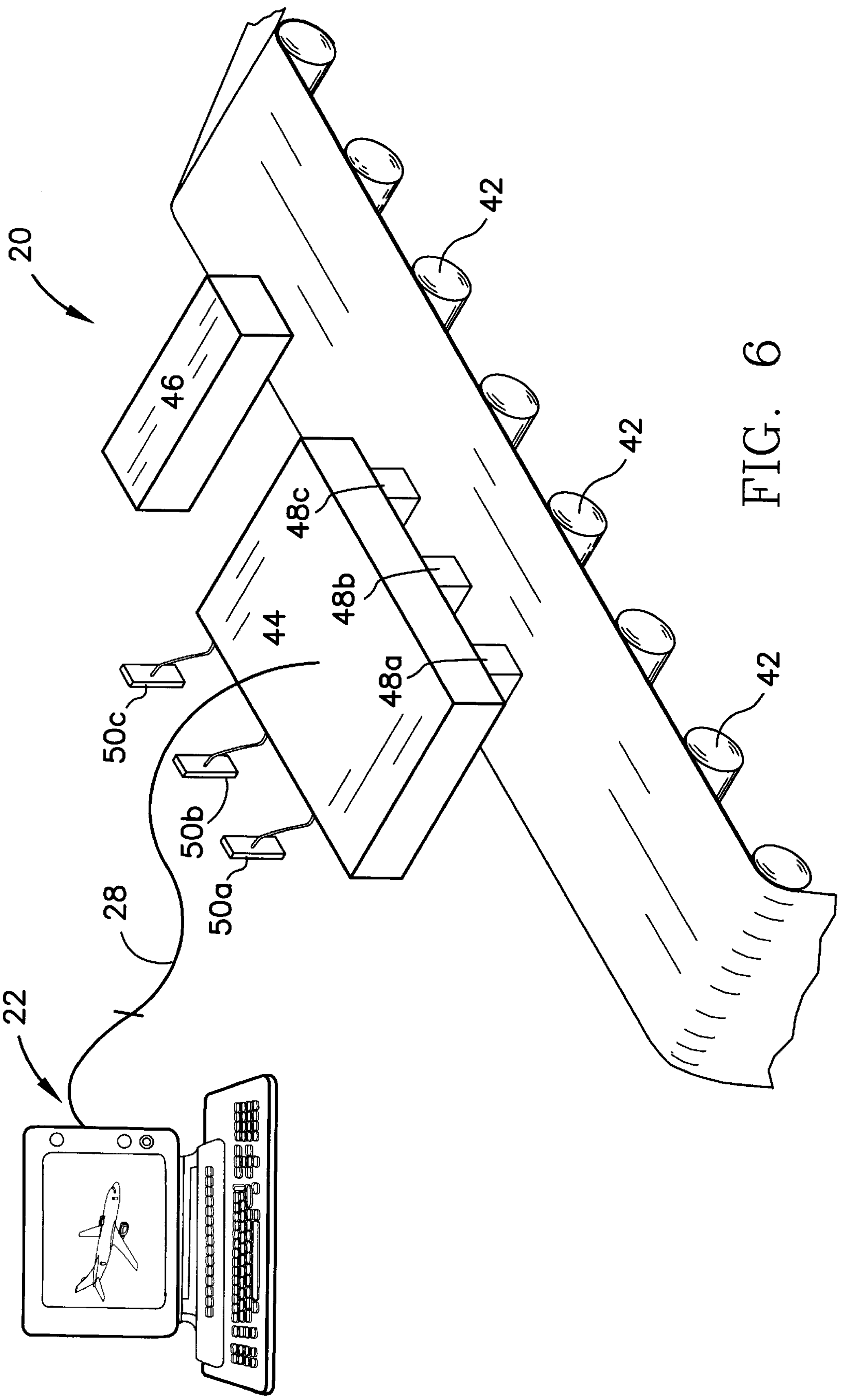
Figure 6A:
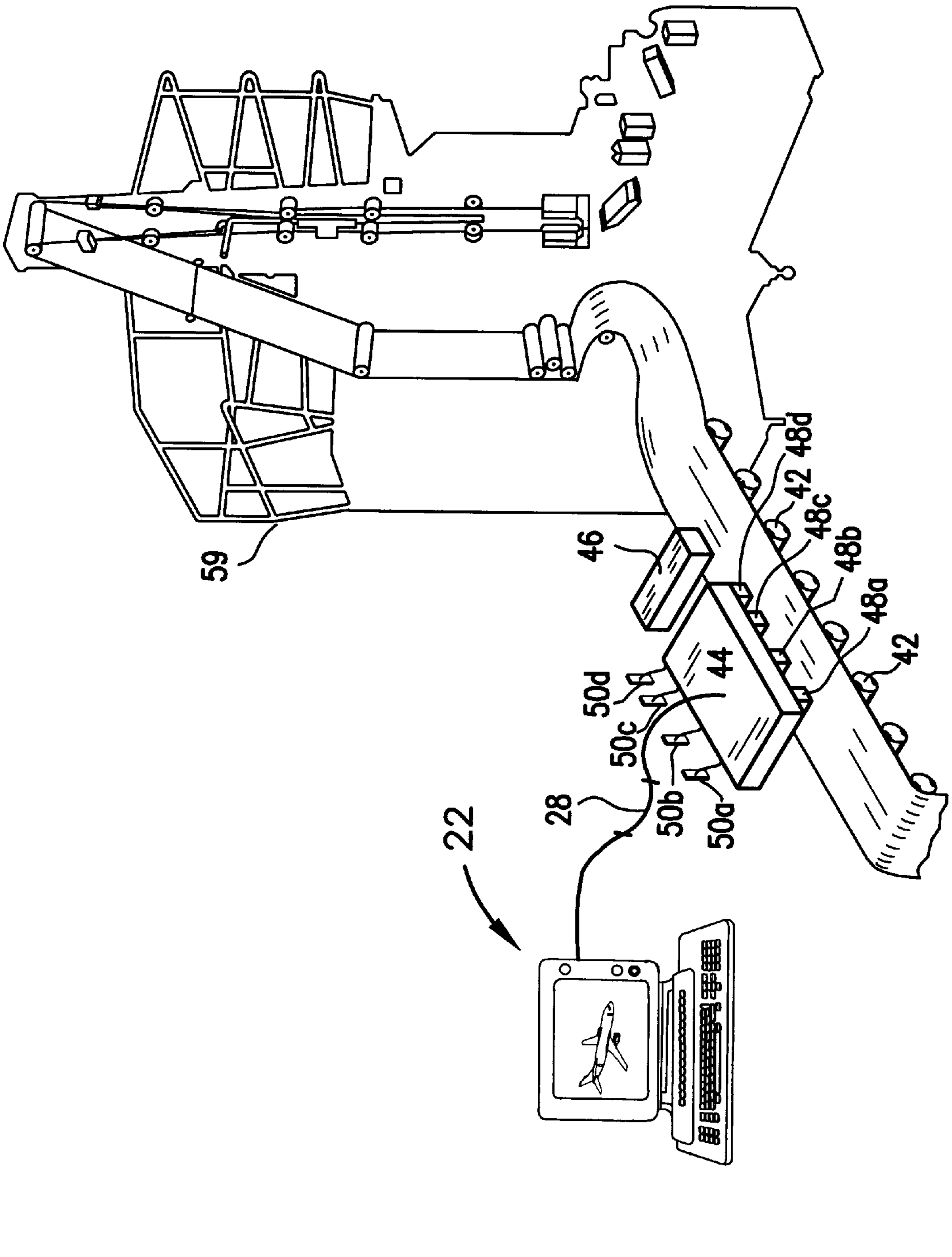
Figure 7:
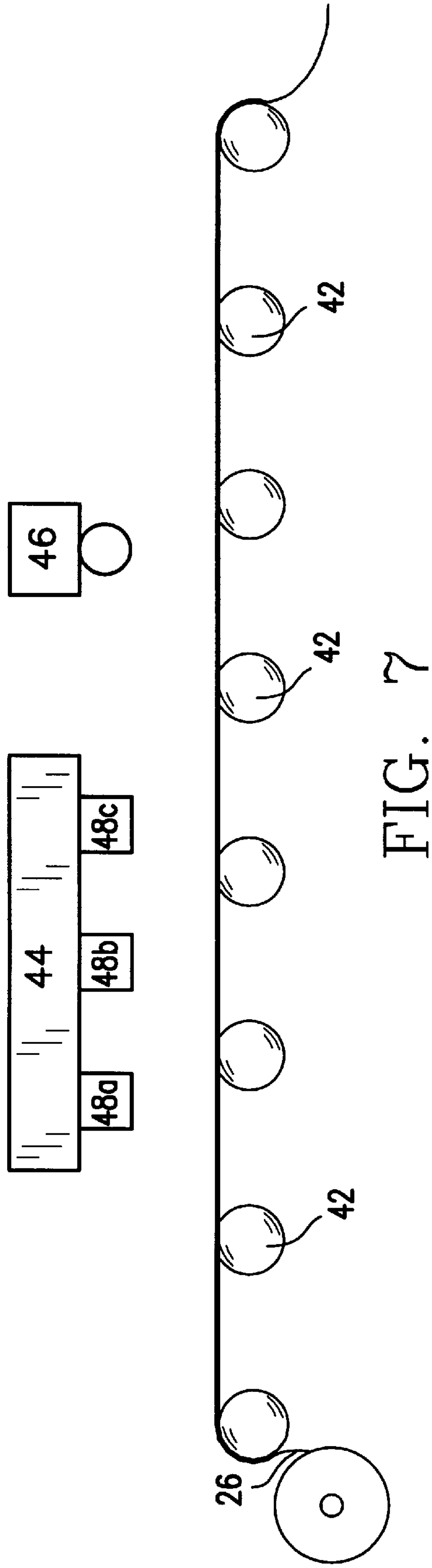

There is illustrated in FIG. 2 a schematic view of the digital printing system of the present invention with a different digital image from that of FIG. 1;

There is illustrated in FIG. 3 a web of packaging material with a first and second digital image printed directly thereon by the digital printing system of the present invention;

There is illustrated in FIG. 4 a web of packaging material for a laminated fiberboard material having fold lines with a first and second digital image printed directly thereon by the digital printing system of the present invention;

There is illustrated in FIG. 5 a pouch with a digital image printed directly thereon by the digital printing system of the present invention;

There is illustrated in FIG. 5A a parallelepiped container with a digital image printed directly thereon by the digital printing system of the present invention;

There is illustrated in FIG. 6 a schematic view of the printing site of the digital printing system of the present invention;

There is illustrated in FIG. 6A a schematic view of the printing site of the digital printing system of the present invention in line with a form, fill and seal packaging machine;

There is illustrated in FIG. 7 a side view of FIG. 6.

Figure 8:
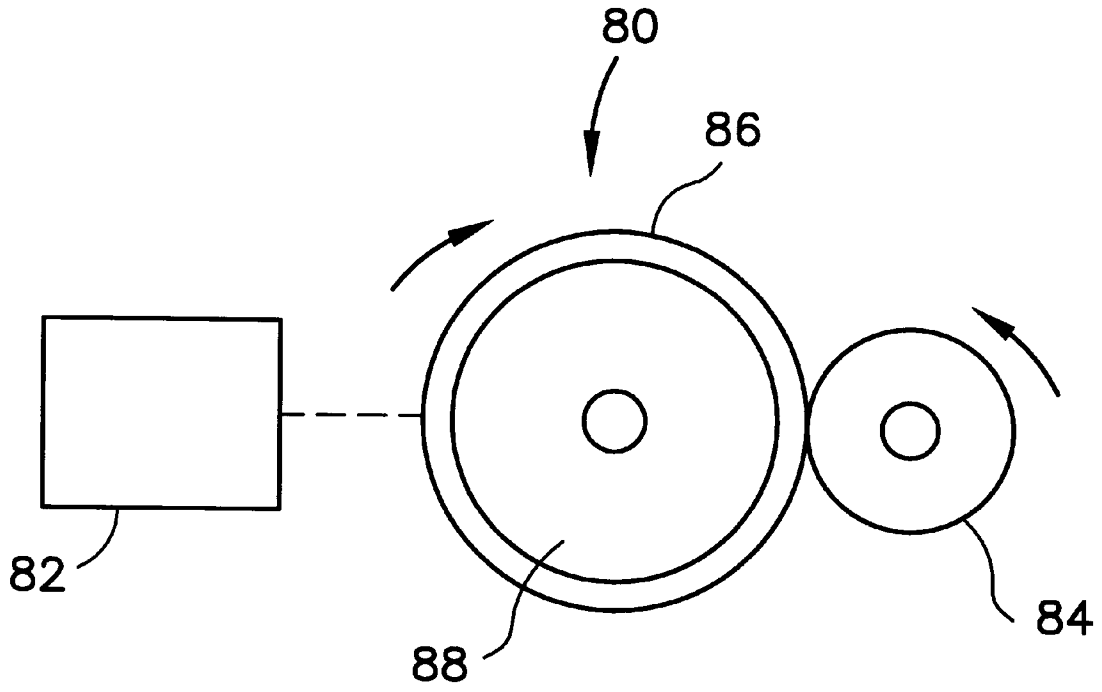

There is illustrated in FIG. 8 an alternative embodiment of the digital printing system of the present invention.

DETAILED DESCRIPTION OF THE INVENTION

Many packages have as their precursor form, the web of packaging material. For instance, plastic pouches, whether self-supporting or not, are formed from a web on a vertical form, fill and seal packaging machine. Similarly, parallelepiped containers such as the TETRA BRIK® container is formed from a web. Even carton blanks for gable top cartons are first formed from a web, then cut and sealed to from the single carton blank. The web of material is partitioned into predetermined sections which will eventually be fabricated into individual packages. The present invention provides a novel method and apparatus for printing a full color digital image directly onto each section.

As can be seen in FIGS. 1 and 2, a digital printing system 20 for printing directly on a web is provided. An electronically storable and retrievable digital graphic image 36*a* or 36*b* is generated at an image generator 22. The image generator 22 may be at a site away from the printing site 24. For instance, the image generator may be at a commercial design studio having apparatus such as digital cameras, scanners, desktop computers, and digital storage devices. The image generator 22 is connected to the printing site via a data transfer device 28 capable of transmitting digitally-generated images electronically. It is contemplated that the data transfer device 28 could include a telephonic modem or other electronic transfer medium, or could alternatively include some combination of electronic and physical transfer, if the image generator 22 is offsite from the printing site 24. If the image generator is on-site at the printing site, then the image generator 22 is connected via standard data lines to the printing site 24.

The digital printing system 20 of the present invention allows for a digital graphic image 36*a* to be directly printed on a section of a web of packaging material 26*a*. The digital printing system 20 also allows for the immediate substitution of another digital graphic image 36*b* for the very next section of a web of packaging material 26*b* being processed at the printing site 24. Thus, as shown in FIGS. 3 and 4, a section of a web of packaging material 26*a* may have a jet plane as the digital graphic image 36*a* while the next section of a web of packaging material 26*b* may have a cow 36*b* as its digital graphic image. The digital graphic image 36 is printed directly onto the section of a web of packaging material 26. As shown in FIG. 5 and FIG. 5A, the web of packaging material may be fabricated into a pouch 27 or a paralelepiped container 29.

The digital graphic image 36 may be created on a computer from a software program, or the digital graphic image 36 may be generated from a digital camera which transfers the image 36 via a disk to a computer 23 as shown in FIGS. 1 and 2. The digital printing system 20 provides for a full color digital graphic image 36 to be printed directly onto a web 26. Of even greater novelty is the ability of the digital printing system 20 to have a digital graphic image 36 generated overseas at an offsite image generator 22 and then immediately printed on a web 26 at a printing site 24 thousands of kilometers away. For example, the blossoming of the cherry trees in Japan may be captured by a digital photograph taken by a digital camera and sent via a modem to a printing site 24 in the United States to be directly printed on a pouch which will contain a cherry flavored water beverage. Alternatively, the present invention allows for a producer of a particular beverage to illustrate ongoing contemporary issues printed directly on a series of pouches, cartons or parallelepiped containers.

The printing site 24 may be provided in conjunction with a material processing line, not shown, which may include such apparatus as flame, corona, or plasma treatment devices, extruders, etc. The printing site 24 may also be provided in proximity with, or as part of, a form, fill and seal packaging machine, not shown, in which the web is processed into individual packages such as pouches or parallelepiped containers containing products such as water, juice or a sports drink, and then sealed for further distribution.

The printing site 24 includes a web, a conveyor means 42, a printer 44, and a curing device 46. The printer 44 has at least one digital printhead 48, which may be provided as an inkjet printhead. In an preferred embodiment, the printer 48 has a plurality of printheads 48 which allow for full color printing of a digital graphic image 36 directly onto the web 26. One suitable printhead is Spectra model 160-600-4 which allows for drop-on demand printing versus continuous jetting of ink. Each printhead 48 is in fluid connection with an ink supply 50. It has been found that UV-reactive inks are particularly well-suited for printing directly onto the web 26. Acceptable inks include cyan U1670, magenta U1688, yellow U1647, and black U1669 manufactured by Coates. In the embodiment shown in FIG. 6, the printer 44 has three printheads 48*a–c* which disperse three different inks, cyan, magenta and yellow. The inks are supplied to their respective printheads 48*a–c* from three separate supplies 50*a–c*.

The curing device 46 is located in proximity with the printer 44. The freshly printed web 26 is exposed to the curing device 46 in order to cure the printed inks, rendering them fixed and scratch-resistant. The curing device 46 may be provided, for example, as a UV source or electron beam device. A suitable UV source 52 is an ultraviolet lamp such as Fusion model F 300.

In an alternative embodiment illustrated in FIG. 6A, a pre-treatment device 60 is provided before the printer 44. The pre-treatment device will treat the web prior to printing at the printer 44. The pre-treatment may be flame, corona or plasma treatment which increases the surface energy of the web to allow for a greater chemical bond between the surface of the web 26 and the ink than would be possible without pre-treatment. The alternative embodiment also has four printheads 48*a–d* instead of the previous three. The fourth printhead 48*d* is black ink supplied from a black ink supply 50*d*. A form, fill and seal packaging machine 59 is shown in line with the means of conveying in order to receive the newly printed web of packaging material 26.

In operation, graphic designers at the image generating site use the various image generating apparatus to produce a digital image intended for the web 26. Next, the digital image is transferred, via the data transfer device 28 to the printing site 24. The web 26 is moved through the printing site via the conveyor means 42 which may be a plurality of rollers. If pre-treatment is warranted, the web 26 is pre-treated either by flame, corona or plasma treatment at the pre-treatment device 60. The web 26 is then conveyed to the printer 44 for printing directly onto the web 26. The printer 44 may have a CPU integrated therein for control of the printheads 48. As each section of the web 26 is conveyed under a printhead 48, ink is printed directly onto the surface of the web 26. The web 26 is, for example, subjected first to one color such as cyan at a first printhead 48*a,* then magenta at another printhead 48*b,* then yellow at a final printhead 48*c* allowing for a full color digital graphic image to be printed directly onto the surface of the web 26. The web is then conveyed to the curing device 46 for curing of the ink allowing for a scratch resistant image on the web 26. The first digital graphic image 36*a* may be substituted for by a subsequent image 36*b* allowing for the very next section of the web to have a different image thereon.

FIG. 8 illustrates an alternative print arrangement 80 suitable for packaging material having irregularly-shaped or heavily-textured surfaces. The print arrangement 80 includes an inkjet printhead 82 similar to that shown and described with reference to FIG. 6. However, rather than printing directly onto the packaging material 84, the printhead directs ink to a pad 86 covering an offset roller 88. Ink is then transferred from the pad 84 to a surface 88 of the packaging material. This arrangement eliminates potential distortion that may be introduced due to ink from the printhead striking an irregular surface.

The present invention permits on-demand, high-quality printing for a wide variety of potential uses in the packaging industry. It is contemplated that the invention can be used to print complex graphics onto a web, with suitable inks individually matched to the materials and to the demands of the marketplace. The present invention offers the opportunity to eliminate traditional labor-intensive pre-press operations, as well as the need for plate and film materials, and to greatly reduce the need to maintain standing inventories of printed packaging materials. Due to the versatility of digitally stored and printed imagery, package designs and information can be stored in computer memories, retrieved, and customized for on-demand production.

What is claimed is:

1. A method of printing a plurality of digital images of graphic designs on a web of packaging material for a flowable food product, the method comprising the steps of:

providing a web of packaging material having an exterior surface and a flowable food contact surface;

generating an electronically storable and retrievable preselected digital image of a graphic design to be printed on the web of packaging material, the preselected digital image of a graphic design capable of being substituted for by another of the plurality of digital images of graphic designs, the plurality of digital images of graphic designs generated at a computer site;

transferring the preselected digital image of a graphic design to an inkjet printer at a printing site at a predetermined time;

passing the web of packaging material through the printing site at a predetermined rate; and jetting an ink through an inkjet printhead directly onto the exterior surface of the web of packaging material, at substantially the predetermined time, to print the preselected digital image of a graphic design directly onto the exterior surface as the web of packaging material passes through the printing site at the predetermined rate thereby creating a printed web of packaging material;

whereby the step of transferring the digital image of a graphic design to a printing site is substantially contemporaneous with the step of jetting an ink through an inkjet printhead to print the preselected digital image of a graphic design directly onto the surface of the web of packaging material allowing for the substitution of the preselected digital image of a graphic design with another of the plurality of digital images of graphic designs without altering the predetermined rate of passing the web of packaging through the printing site.

2. The method according to claim 1 wherein the step of jetting an ink through an inkjet printhead further comprises jetting a first color of ink through a first inkjet printhead and then jetting a second color of ink through a second inkjet printhead.

3. The method according to claim 1 further comprising corona treating a surface of the web of packaging material.

4. The method according to claim 1 further comprising flame treating a surface of the web of packaging material.

5. The method according to claim 1 further comprising plasma treating a surface of the web of packaging material.

6. The method according to claim 1 wherein the web of packaging material is a flexible plastic material.

7. The method according to claim 1 wherein the web of packaging material is a laminated fiberboard material.

8. The method according to claim 7 wherein the laminated fiberboard material is intended for fabrication into a parallelepiped container.

9. The method according to claim 7 wherein the laminated fiberboard material is intended for fabrication into a carton.

10. An apparatus for printing a plurality of digital images of graphic designs on a web of packaging material, the apparatus comprising:

means for generating an electronically storable and retrievable preselected digital image of a graphic design to be printed on the packaging, the preselected digital image of a graphic design capable of being substituted for by another of the plurality of digital images of graphic designs, the plurality of digital images of graphic designs generated at a computer site;

means for transferring the digital image of a graphic design to a printing site;

means for conveying the web of packaging material through the printing site;

an inkjet printhead for jetting an UV-reactive ink onto a surface of the web of packaging material to print the digital image of a graphic design onto the surface of the web of packaging material as the web of packaging material moves through the printing site at the predetermined rate thereby creating a web of packaging material with an indelible graphic design thereon, the inkjet printhead, means for transferring the digital image and means for conveying the web of packaging material cooperate with one another, wherein the digital image is transferred to the printing site and to the printhead contemporaneously with conveying the web material to the print site; and means for curing the UV-reactive ink through exposing the UV-reactive ink to UV light;

whereby the step of transferring the digital image of a graphic design to a printing site is substantially contemporaneously with the step of jetting an ink through an inkjet printhead to print the preselected digital image of a graphic design directly onto the surface of the web of packaging material allowing for the substitution of the preselected digital image of a graphic design with another of the plurality of digital images of graphic designs without altering the predetermined rate of conveying the web of packaging material through the printing site.

11. The apparatus according to claim 10 further comprising a plurality of inkjet printheads for jetting an UV-reactive ink onto a surface of the web of packaging material to print a full color digital image of a graphic design onto the surface of the web of packaging material.

12. The apparatus according to claim 11 wherein the plurality of inkjet printheads includes a printhead for printing cyan ink, a printhead for printing magenta UV reactive ink, and a printhead for printing yellow ink.

13. The apparatus according to claim 11 further comprising a pre-treatment device for pre-treating the web of packaging material prior printing to increase the surface energy of the web of packaging material.

14. The apparatus according to claim 10 further comprising a form, fill and seal packaging machine integrated with the conveying means for receiving the web of packaging material.

15. The apparatus according to claim 10 wherein the curing means is a UV lamp.

16. The apparatus according to claim 12 further comprising a plurality of supplies of ink for each of the inkjet printheads, each of the supplies of ink in flow communication with their respective inkjet printhead.

17. An apparatus for printing a digital color image of graphic design on a web of packaging material, the apparatus comprising:

means for conveying the web of packaging material;

a first inkjet printhead for printing a first color UV reactive ink directly onto the surface of the web of packaging material;

a second inkjet printhead for printing a second color UV reactive ink directly onto the surface of the web of packaging material;

means for transferring a color digital to the first and second printheads substantially contemporaneously with conveying the web of packaging material to the printheads; and a curing device for curing the first and second UV reactive inks through exposure to UV radiation;

whereby a color digital image of a graphic design is printed on the web of packaging material.

18. The apparatus according to claim 17 further comprising a third inkjet printhead for printing a third color UV reactive ink directly onto the surface of the web of packaging material.

19. The apparatus according to claim 18 further comprising a fourth inkjet printhead for printing a fourth color UV reactive ink directly onto the surface of the web of packaging material.

20. The apparatus according to claim 17 further comprising a pre-treatment device for pre-treating the web of packaging material prior printing to increase the surface energy of the web of packaging material.

* * * * *